United States Patent
Phua et al.

(10) Patent No.: US 7,151,898 B1
(45) Date of Patent: Dec. 19, 2006

(54) DETERMINISTIC FIRST AND SECOND ORDER POLARIZATION MODE DISPERSION COMPENSATOR

(75) Inventors: Poh-Boon Phua, Singapore (SG); Hermann A. Haud, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 643 days.

(21) Appl. No.: 10/338,278

(22) Filed: Jan. 8, 2003

Related U.S. Application Data

(60) Provisional application No. 60/351,948, filed on Jan. 24, 2002.

(51) Int. Cl.
*H04B 10/18* (2006.01)
*H04B 10/08* (2006.01)
*H04B 10/12* (2006.01)
*H04B 10/04* (2006.01)
*H04B 10/06* (2006.01)

(52) U.S. Cl. .................. 398/158; 398/161; 398/81; 398/147; 398/148; 398/149; 398/150; 398/151

(58) Field of Classification Search ........ 398/147–152, 398/158
See application file for complete search history.

(56) References Cited

U.S. PATENT DOCUMENTS

| | | | |
|---|---|---|---|
| 6,385,356 B1 * | 5/2002 | Jopson et al. ............... | 385/11 |
| 6,385,357 B1 * | 5/2002 | Jopson et al. ............... | 385/11 |
| 6,412,131 B1 * | 7/2002 | Zhao et al. .................. | 73/659 |
| 6,417,948 B1 * | 7/2002 | Chowdhury et al. ........ | 398/158 |
| 6,538,787 B1 * | 3/2003 | Moeller et al. ............. | 398/158 |
| 6,559,991 B1 * | 5/2003 | Farley et al. ............... | 398/152 |
| 6,750,956 B1 * | 6/2004 | Moeller ..................... | 356/73.1 |
| 2001/0028760 A1 * | 10/2001 | Yaffe .......................... | 385/27 |

OTHER PUBLICATIONS

Agere Systems, "Polarization Controller Overview", Jun. 2002, pp. 1-7.
Chou et al., "Real-Time Principal State Characterization for Use in PMD Compensators", *IEEE Photonics Tech. L*, vol. 13, No. 6, Jun. 2001, pp. 568-570.
Gordon et al., "PMD fundamentals: Polarization mode dispersion in optical fiers", PNAS, vol. 97, No. 9, Apr. 25, 2000, pp. 4541-4550.
Heismann et al., "Automatic Compensation of First-Order Polarization Mode Dispersion in a 10 Gb/s Transmission System", ECOC'98, Sep. 20-24, 1998, Madrid, Spain, pp. 529-530.
Heismann, "Analysis of a Reset-Free Polarization Controller for Fast Automatic Polarization Stabilization in Fiber-optic Transmission Systems", *J. Lightwave Tech.*, vol. 12, No. 4, Apr. 1994, pp. 690-699.
Merker et al., "PMD compensation up to second order by tracking the principle states of polarization using a two-section compensator", *Optics Communications* 198 (2001), pp. 41-47.

(Continued)

*Primary Examiner*—Kenneth Vanderpuye
*Assistant Examiner*—Danny Wai Lun Leung
(74) *Attorney, Agent, or Firm*—Brenda Pomerance

(57) ABSTRACT

A polarization mode dispersion (PMD) feedforward compensator compensates first and second order PMD. An optical signal is provided to a PMD detector that senses first and second order PMD in the optical signal and produces control signals for the PMD compensator. The PMD compensator comprises, in series, a first polarization controller, an adjustable delay, a second polarization controller, a first fixed delay, a third polarization controller and a second fixed delay.

16 Claims, 5 Drawing Sheets

OTHER PUBLICATIONS

Noe et al., "Polarization Mode Dispersion Compensation at 10, 20, and 40 Gb/s with Various Optical Equalizers", *J. Lightwave Tech.*, vol. 17, No. 9, Sep. 1999, pp. 1602-1616.

Noe et al., "Integrated optical $LiNbO_3$ distributed polarization mode dispersion compensator in 20 Gbit/s transmission system", *Electronics Letters*, vol. 35, No. 8, Apr. 15, 1999, pp. 652-654.

Noe et al., "Fiber-based Distributed PMD Compensation at 20 Gb/s", ECOC'98, Sep. 20-24, 1998, Madrid, Spain, pp. 157-159.

Patscher et al., "Component for Second-Order Compensation of Polarization-Mode Dispersion", http://www.uis.edu/~trammell/MaterialsScience/bands/sld001.htm, Apr. 1997, 6 pages.

Phua et al., "Deterministic Approach to First- and Second-Order PMD Compensation", *IEEE Photonics Tech. L.*, vol. 14, No. 9, Sep. 2002, pp. 1270-1272.

Sunnerud et al., "A Comparison Between Different PMD Compensation Techniques", *J. Lightwave Tech.*, vol. 20, No. 3, Mar. 2002, pp. 368-378.

Yu et al., "Higher Order Polarization Mode Dispersion Compensation Using a Fixed Time Delay Followed by a Variable Time Delay", *IEEE Photonics Tech. L.*, vol. 13, No. 8, Aug. 2001, pp. 863-865.

* cited by examiner

DETERMINISTIC FIRST AND SECOND ORDER POLARIZATION MODE DISPERSION COMPENSATOR

CROSS-REFERENCE TO RELATED APPLICATIONS

This application claims priority from U.S. provisional patent application Ser. No. 60/351,948, filed Jan. 24, 2002, having common inventors and a common assignee herewith.

BACKGROUND OF THE INVENTION

The present invention relates to fiber optic systems, and more particularly, is directed to a polarization mode dispersion compensator for long fiber cables.

Polarization mode dispersion (PMD) generally refers to variations in the time delay of a polarized optical signal traveling through an optical transmission system, such as a single-mode optical fiber. PMD arises in an optical fiber because of asymmetries in the optical fiber core, such as core ellipticity created during optical manufacturing and bending stresses resulting from handling the fiber or installing the fiber. Asymmetries in the fiber core cause random changes in the state of polarization (SOP) of optical signals propagating through the fiber. Different SOPs propagate through the optical fiber core at different speeds, resulting in pulse distortion in a transmitted optical signal. Additionally, asymmetries in the core are susceptible to environmental changes, such as temperature or fiber movement, which occur rapidly and further distort the transmitted optical signal.

First order PMD refers to a time delay between two orthogonally polarized principal states of polarization (PSPs). The PSPs are a convenient basis set to describe and characterize each SOP and to evaluate the effects of PMD in the fiber. Using the PSPs as a basis set, each SOP propagating through the fiber is represented as a linear combination of the two orthogonally polarized PSPs. The varying pulse distortion of the SOP is a function of the varying delay between the PSPs.

Second order PMD refers to the frequency dependence of the first order PSP. Second order PMD further distorts the optical signal propagating in the fiber.

Sunnerud et al., "A Comparison Between Different PMD Compensation Techniques", *IEEE J. Lightwave Tech.*, vol. 20, no. 3, March 2002, pp 368–378, presents several designs for PMD compensators, shown in FIGS. 1A–1F. Sunnerud teaches that feedback is required for effective PMD compensation, but this makes compensation slow. Sunnerud also explains that a large number of control parameters has the advantage of providing multiple degrees of freedom but the disadvantage of complexity. The more degrees of freedom, the longer it takes to arrive at an optimal solution. FIG. 1A shows a polarization controller (PC) used to align the SOP with one of the input PSPs. FIG. 1B shows a PC and fixed time delay, providing two degrees of freedom (DOFs). FIG. 1C shows a PC and variable time delay, providing three DOFs. FIG. 6 shows a variable delay line in free space. A variable time delay enables adjustment of the differential group delay (DGD) (the difference in flight time between the PSPs through the optical fiber core). FIG. 1D shows a double stage compensator with fixed delays, providing four DOFs. FIG. 1E shows a double stage compensator with one fixed delay and one variable delay, providing five DOFs.

PMD can be represented by vectors in three-dimensional Stokes space. Each vector has three coordinates, corresponding to three DOFs. To fully compensate first and second order PMD, at least six DOFs are required. None of Sunnerud's devices can fully compensate first and second order PMD.

Noe et al, "Integrated optical LiNbO$_3$ distributed polarization mode dispersion compensation in 20 Gbit/s transmission system", *Electronics Letters*, 15 Apr. 1999, vol. 35, no. 8, pp 652–654, teaches representing PMD as a sequence of three dimensional vectors, each having a length proportional to the DGD of a particular fiber section and differing in direction from its predecessor according to the polarization transformations therebetween. Noe teaches that a PMD compensator mirrors the DGD profile of the fiber, following its vector sequence in reverse direction back to the origin. Noe proposes cascading 73 mode converters to form a PMD compensator, cascading this device with a similar shorter device, and using 246 voltages to control this PMD compensator. However, dynamically adapting the 246 control voltages to the real-time PMD variations in the fiber is extraordinarily complicated and time consuming.

U.S. patent application Ser. No. 09/785,039, filed Feb. 15, 2001, having a common inventor and assignee herewith, presents a feedforward technique of PMD compensation, and is hereby incorporated by reference in its entirety. As shown in FIGS. 2A–2C, a PMD detector, comprising a polarimeter and processor, diagnoses the fibers' PMD parameters, and feeds appropriate control signals forward to a PC and an adjustable delay. However, the proposed devices have only three DOFs and so these cannot fully compensate first and second order PMD.

To provide faster data transmission, it is necessary to further cure the distortion caused by PMD.

SUMMARY OF THE INVENTION

In accordance with an aspect of this invention, there are provided a method of and a device for reducing distortion in an optical signal. The first order PMD and second order PMD in the optical signal are sensed, and at least one control signal is generated in accordance with the sensed first and second order PMD. The optical signal is altered in accordance with the at least one control signal to generate a corrected optical signal that is substantially devoid of first and second order PMD.

A feature of this invention is that the at least one control signal is a feedforward control signal.

The altering is performed by a PMD compensator including three polarization controllers arranged in series. Each of the polarization controllers is a cascade of at least two tunable wave-plates with fixed slow axis of orientation, or a cascade of at least two fixed wave-plates with adjustable slow axis of orientation. The at least one control signal includes signals $C_0$, $C_1$, $C_2$ for each of the three polarization controllers given by $C_0 \vec{\tau}_f = -(R_c)^+ \vec{\tau}_c$, $C_0 \vec{\tau}_{\omega f} = -(R_c)^+ \vec{\tau}_{\omega c}$, $C_1 \vec{\tau}_1 = (R_3 C_2 R_2)^+ \vec{A}$ and $C_2 \vec{\tau}_2 = R_3^+ \vec{B}$.

The PMD compensator performing the altering also includes a variable delay in series between two or the three polarization controllers, that may be a variable delay line in free space. The at least one control signal includes a signal of the magnitude of the solution of $\vec{A}$ given by $\vec{\tau}_c - \vec{\tau}_3 = \vec{B} + \vec{A}$.

The PMD compensator performing the altering further includes two fixed delays in series with the polarization controllers.

A PMD detector performs the sensing by using an optical filter and a polarimeter, and the generating by using a computer.

It is not intended that the invention be summarized here in its entirety. Rather, further features, aspects and advantages of the invention are set forth in or are apparent from the following description and drawings.

DETAILED DESCRIPTION

The following abbreviations are used herein:

| | |
|---|---|
| DGD | differential group dealy |
| DOF | degree of freedom |
| PC | polarization controller |
| PMD | polarization mode dispersion |
| PSP | principal state of polarization |
| SOP | state of polarization |

Figure 1A:
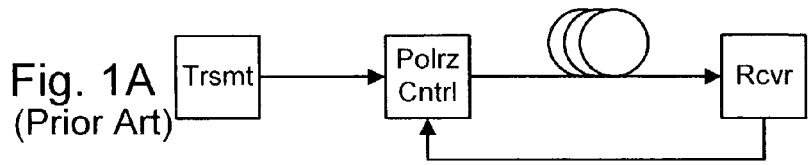
FIGS. 1A–1F are block diagrams showing feedback PMD compensators.
Figure 1B:
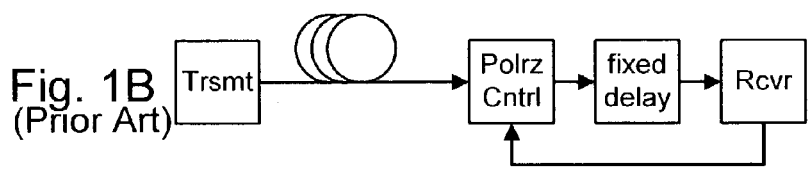
Figure 1C:
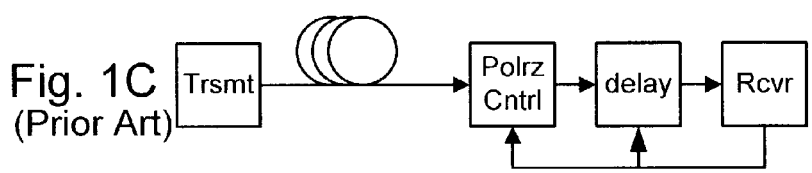
Figure 1D:
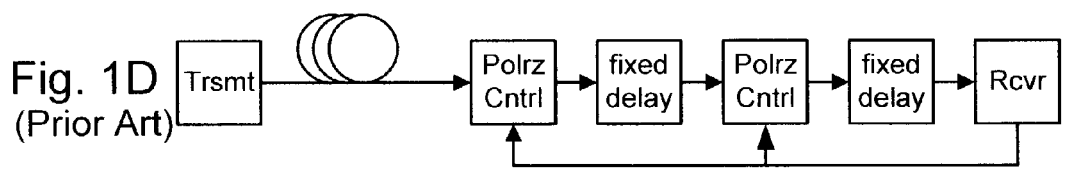
Figure 1E:
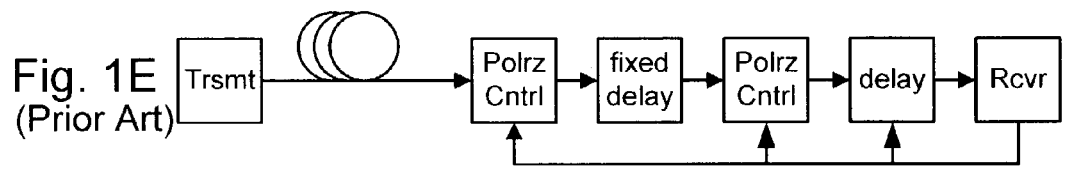
Figure 1F:
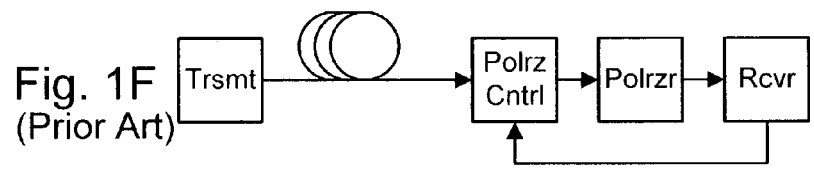
Figure 2A:
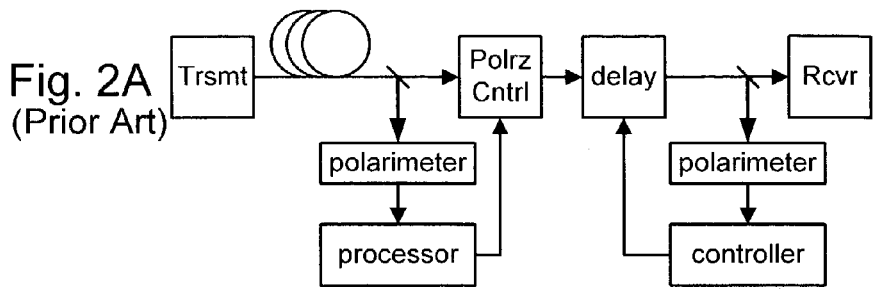
FIGS. 2A–2C are block diagrams showing feedback first order PMD compensators.
Figure 2B:
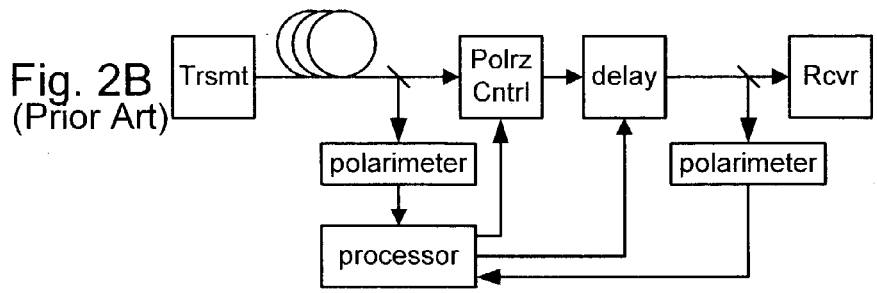
Figure 2C:
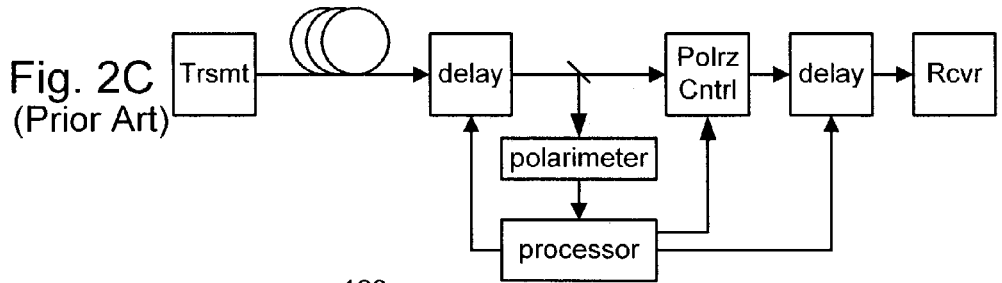
Figure 3:
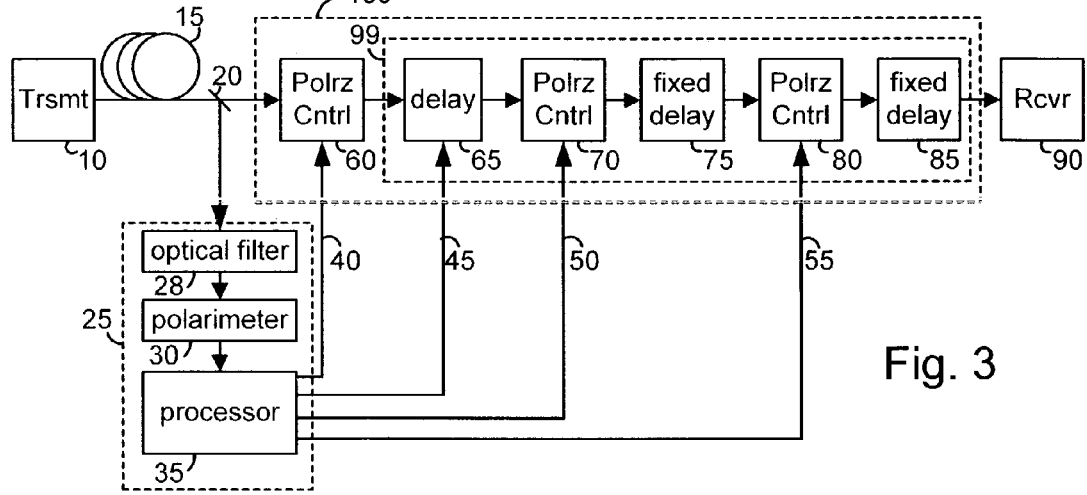
FIG. 3 is a block diagram showing a feedforward first and second order PMD compensator.

FIG. 3 shows a PMD feedforward compensator capable of fully compensating first and second order PMD. FIG. 3 illustrates transmitter 10 sending a lightwave signal along optical fiber 15 to beam splitter 20 that provides the lightwave signal to PMD detector 25 and to PMD compensator 100. Transmitter 110 includes a light source, such as a laser diode, and optionally includes a polarization scrambler that randomly varies the polarization state of the optical signal prior to providing the optical signal to optical fiber 15.

PMD detector 25 produces control signals 40, 45, 50 and 55 for PMD compensator 100. The output of PMD compensator 100 is a corrected lightwave signal that is substantially devoid of first and second order PMD. The corrected signal is supplied to receiver 90. PMD detector 25 comprises optical filter 28, polarimeter 30 and processor 35. The operation of PMD detector 25 is generally described in co-pending U.S. patent application Ser. No. 10/263,779, filed Oct. 4, 2002, having a common inventor and assignee herewith, the disclosure of which is hereby incorporated by reference in its entirety.

Figure 6:
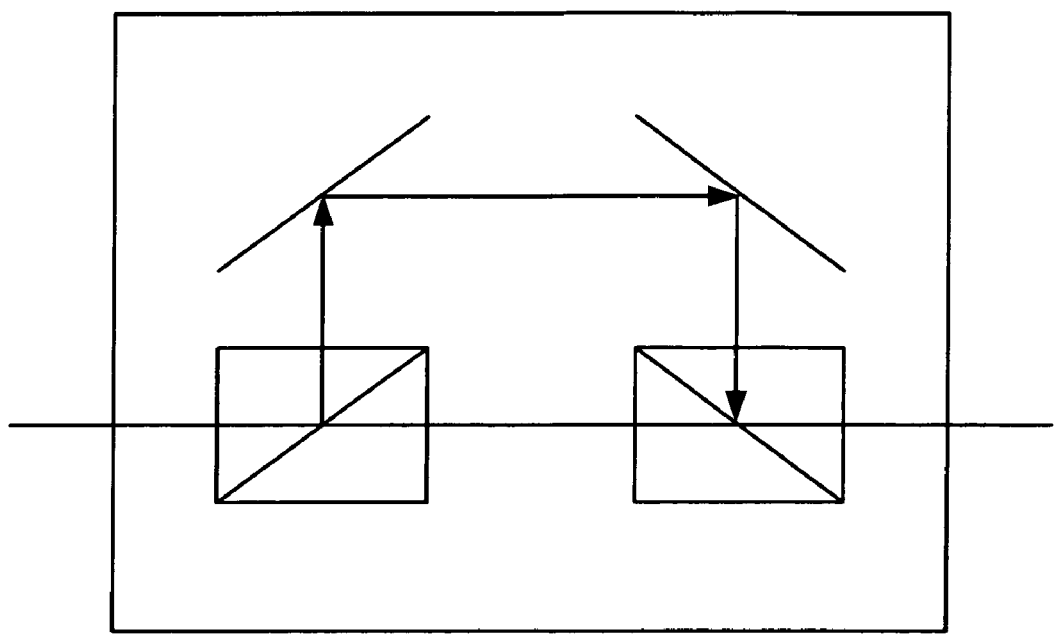
FIG. 6 is a diagram showing a variable delay line in free space.

PMD compensator 100 comprises delays 65, 75, 85 serving as three first order PMD segments, and PCs 60, 70, 80, serving as polarization rotators. PCs 60, 70, 80 are each a cascade of two or three tunable wave-plates with fixed slow axis of orientation, or may each be a cascade of two or three fixed wave-plates with adjustable slow axis of orientation. Delay 65 is adjustable and thus enables adjustment of the DGD. Delay 65 may be as shown in FIG. 6. Control signals 40, 45, 50 and 55 are respectively supplied to PC 60, delay 65, PC 70 and PC 80.

An advantage of the arrangement of FIG. 3 is that it fully compensates first and second order PMD, enabling higher fiber optic system transmission speeds. Another advantage is that since it is a feedforward configuration, it is fast. Yet another advantage is that it is of simple construction.

Determination of control signals 40, 45, 50 and 55 will now be discussed.

Polarization refers to the direction of the electric field vector F. The SOP of E is determined by its orthogonal components:

$$E_x = \vec{i} E_{0x} \cos(kz - \omega t) \quad \text{(eq. 1a)}$$

$$E_y = \vec{j} E_{0y} \cos(kz - \omega t + \phi) \quad \text{(eq. 1b)}$$

Figure 4A:
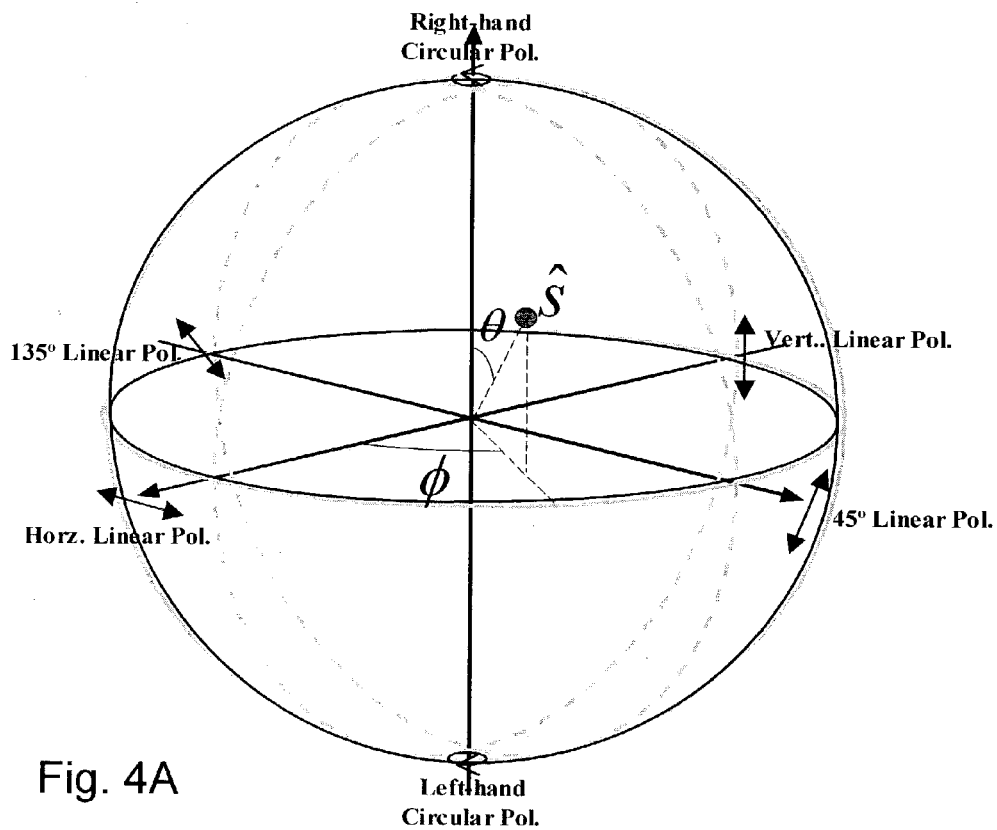
FIG. 4A is a graph showing a Poincare sphere.

FIG. 4A shows a Poincare sphere. Each point on the sphere represents a different SOP. Points on the sphere's surface represent purely polarized SOPs. Points inside the sphere represent partially polarized SOPs. Linear polarization, where $\phi = m\pi$, $m = 0, +1, +2, \ldots$, occurs at the equator of the Poincare sphere. Circular polarization, where the phase shift between components is $\pm \pi/2 + 2m\pi$, $m = 0, \pm 1, \pm 2 \ldots$, and $E_{0x} = E_{0y} = E_0$, occurs at the poles of the Poincare sphere. Elliptical polarization occurs at all other points.

Each SOP on the Poincare sphere is identifiable by coordinates, called the normalized Stokes parameters, that depend on its latitude $2\beta$ and its longitude $2\lambda$ as:

$$S_1(\omega) = \cos(2\beta)\cos(2\lambda) \quad \text{(eq. 2a)}$$

$$S_2(\omega) = \cos(2\beta)\cos(2\lambda) \quad \text{(eq. 2b)}$$

$$S_3(\omega) = \sin(2\beta) \quad \text{(eq. 2c)}$$

A Stokes vector is a 4×1 matrix of Stokes parameters, defined as follows:

$S_0 = E_{0x}^2 + E_{0y}^2$, average power of the lightwave $S_1 = E_{0x}^2 - E_{0y}^2$, power difference between the horizontal and vertical linear components $S_2 = 2E_{0x}E_{0y}\cos\phi$, power difference between the +45° and −45° linear polarization $S_3 = 2E_{0x}E_{0y}\sin\phi$, power difference between right- and left-hand circular polarization.

The Stokes vector originates from the center of the Poincare sphere and has a magnitude of $(S_1^2 + S_2^2 + S_3^2)^{0.5}$ Polarimeter 30 measures a weighted average of the Stokes vector across the spectrum of the lightwave signal.

The PMD $\vec{\tau}$ of transmitting fiber 15 has a Taylor series expansion as follows:

$$\vec{\tau}(\omega) = \vec{\tau}(\omega_1) + \vec{\tau}_\omega(\omega - \omega_1) + \frac{1}{2}\vec{\tau}_{\omega\omega}(\omega - \omega_1)^2 + \ldots \quad \text{(eq. 3)}$$

Figure 4B:
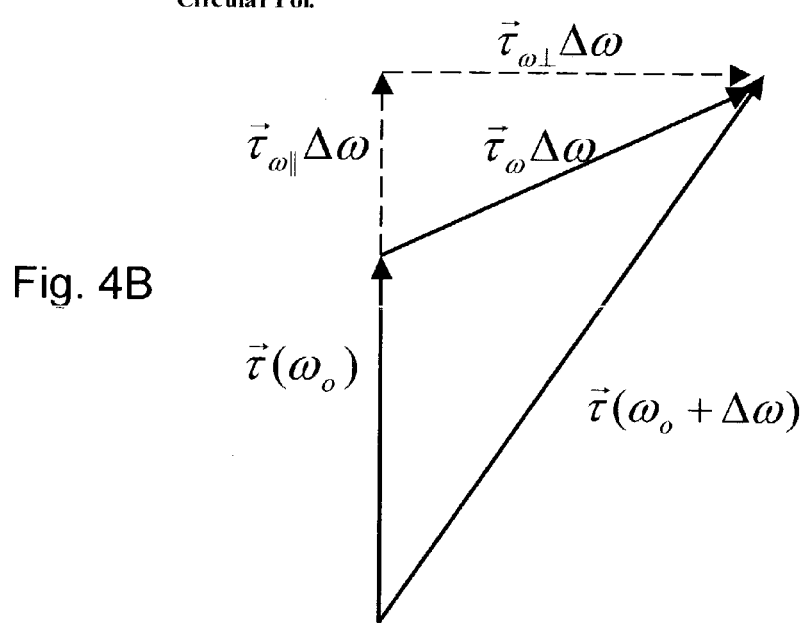
FIG. 4B is a diagram showing a PMD vector having components corresponding to first order and second order PMD.

The first term is the first order PMD. The second term is the second order PMD. FIG. 4B shows the components of second order PMD. The vertical dashed line $\vec{\tau}_{\omega\|}$ gives rise to polarization dependent chromatic dispersion. The horizontal dashed line $\vec{\tau}_{\omega\perp}$ couples power between the two PSPs of $\omega_0$.

The compensator of FIG. 3 consists of three pure first order PMD concatenated segments. The first order PMD vectors and the Mueller rotation matrices for each segment are $\{\vec{\tau}_1, R_1\}$, $\{\vec{\tau}_2, R_2\}$ and $\{\vec{\tau}_3, R_3\}$. These are fixed parameters of the compensation system, except for $|\vec{\tau}_1|$ which is adjustable. In the embodiment of FIG. 3, the adjustable first order PMD segment delay 65 is a variable delay line in free space. Assume negligible second order PMD for each of the individual segments. In the embodiment of FIG. 3, delays 75 and 85 are fixed group velocity delay lines in free space; in other embodiments, delays 75 and 85 are polarization maintaining fiber with negligible second order PMD; and in other embodiments, delays 75 and 85 are bulk birefringence crystals. The polarization controllers 60, 70, 80 have rotation matrices that are given by $C_0$, $C_1$ and $C_2$, that are assumed to be frequency independent over the frequency range of interest. Portion 99 comprises compensator 100 excluding polarization controller 60. The resulting PMD vectors for portion 99 are represented by $\vec{\tau}_c$ for first order PMD, $\vec{\tau}_{\omega c}$ for second order PMD and $R_c$ for its rotation matrix (which is equal to $R_3 C_2 R_2 C_1 R_1$).

Let the polarization-dependent loss or gain in the link be neglected. Let it be assumed that the first order PMD, $\vec{\tau}_f$ and second order PMD, $\vec{\tau}_{\omega f}$, of long haul transmission cable 15 have been monitored in real time. The Chou et al. reference presents a real-time estimation of first order PMD based on scrambling of the input state of polarization (SOP) so that the output time-averaged SOP is distributed on an ellipsoid in the Stokes space representation. The ellipsoid is in contact with the unit Poincare sphere at the two points corresponding to the principal states of polarization (PSP). Phua et al., "New 1st and 2nd order PMD characterization using time-average state-of-polarization variation with signal's bandwidth", *Proc. OSU Annual Meeting*, Long Beach, Calif., 2002, Paper TuY4, the disclosure of which is hereby incorporated by reference in its entirety, proposed another PMD estimation technique in which the tapped signal is optically filtered before the polarimeter, and the averaged SOP is measured for various spectral bandwidths. The averaged SOP departs increasingly from the surface of Poincare sphere, with increasing bandwidth. Based on the trajectory of the averaged SOP, we can determine the orientation of the PSP and the DGD. This technique can be extended for second order PMD characterization.

$\vec{\tau}_f$ and $\dot{\vec{\tau}}_{\omega f}$ are the first and second order PMD of transmission cable 15 while $\vec{\tau}_c$ and $\vec{\tau}_{107\,c}$ are the first and second order PMD of portion 99. For PMD compensation, we need to set PMD compensator 100 appropriately so that the net PMD vectors, $\vec{\tau}$ and $\vec{\tau}_\omega$, equal to zero.

After knowing $\vec{\tau}_j$ and $\vec{\tau}_{\omega f}$, we need to work out the Mueller rotation matrices for the required polarization rotations, $C_0$, $C_1$, $C_2$, and the DGD, $|\vec{\tau}_1|$, of variable delay line 65 in order to achieve the necessary compensation.

From FIG. 3, the total first and second order PMD vectors, $\{\vec{\tau}, \vec{\tau}_\omega\}$ when considering both the transmission cable and the compensator together, are found using the PMD vector concatenation rules set forth in Gordon et al., "PMD fundamentals: Polarization mode dispersion in optical fibers, *Proc. Nat. Acad. Sci.*, vol. 97, Apr. 25, 2000, pp 4541–4550, the disclosure of which is hereby incorporated by reference in its entirety.

$$\vec{\tau} = \vec{\tau}_c + R_c C_0 \vec{\tau}_f \tag{eq. 4}$$

$$\vec{\tau}_\omega = \vec{\tau}_{\omega c} + R_c C_0 \vec{\tau}_{\omega f} + \vec{\tau}_c \times \vec{\tau} \tag{eq. 5}$$

For total PMD compensation, we require that $\vec{\tau}$ and $\vec{\tau}_\omega$ be zero. This implies $$\vec{\tau}_c = -R_c C_0 \vec{\tau}_f \tag{eq. 6}$$

$$\vec{\tau}_{\omega c} = -R_c C_0 \vec{\tau}_{\omega f} \tag{eq. 7}$$

Since $\vec{\tau}_f$ and $\vec{\tau}_{\omega f}$ are known from our real time PMD characterization technique, portion 99 just needs to generate a pair of $\vec{\tau}_c$ and $\vec{\tau}_{\omega c}$ vectors, such that $\vec{\tau}_c \cdot \vec{\tau}_{\omega c} = \vec{\tau}_f \cdot \vec{\tau}_{\omega f}$, $|\vec{\tau}_c| = |\vec{\tau}_f|$ and $|\vec{\tau}_{\omega c}| = |\dot{\vec{\tau}}_{\omega f}|$. And again from PMD vector concatenation rules, the PMD vectors of portion 99 can be expressed as:

$$\vec{\tau}_c = \vec{\tau}_3 + R_3 C_2 \vec{\tau}_2 + R_3 C_2 R_2 C_1 \vec{\tau}_1 \tag{eq. 8}$$

$$\vec{\tau}_{\omega c} = (\vec{\tau} \times \vec{\tau}_c) + R_3 C_2 \vec{\tau}_2 \times R_3 C_2 R_2 C_1 \vec{\tau}_1 \tag{eq. 9}$$

To simplify notation, we denote $$\vec{B} = R_3 C_2 \vec{\tau}_2 \tag{eq. 10}$$

$$\vec{A} = R_3 C_2 R_2 C_1 \vec{\tau}_1 \tag{eq. 11}$$

Thus (eq. 8) and (eq. 9) become $$\vec{\tau}_c - \vec{\tau}_3 = \vec{B} + \vec{A} \tag{eq. 12}$$

$$\vec{\tau}_{\omega c} - (\vec{\tau}_3 \times \vec{\tau}_c) = \vec{B} \times \vec{A} \tag{eq. 13}$$

The vector $\vec{B}$ is adjustable in orientation using the rotation matrix $C_2$. The vector $\vec{A}$ is arbitrarily adjustable in orientation and magnitude using the rotation matrix $C_1$ and the adjustable group delay $|\vec{\tau}_1|$. Our aim is to solve for $\vec{A}$ and $\vec{B}$, so that we can compute their respective rotation matrices, $C_2$ and $C_1$, from (eq. 10) and (eq. 11), since we know $R_3$, $\vec{\tau}_2$ and $R_2$ of the individual segment. We also know the direction of $\vec{\tau}_1$. However, its magnitude is only known when we have solved for $\vec{A}$ (i.e. $|\vec{\tau}_1| = |\dot{A}|$). The procedure is simplified if we use another available degree of freedom, the rotation matrix $C_0$ of PC 60. For any given $\vec{\tau}_j$ and $\vec{\tau}_{\omega f}$ of the fiber cable to be compensated, $C_0$ can be used to turn $\vec{\tau}_c$ and $\vec{\tau}_{\omega c}$ into a plane containing $\vec{\tau}_3$, according to (eq. 6) and (eq. 7). Thus, we can arbitrarily fix $\vec{\tau}_c$ and $\vec{\tau}_{\omega c}$ to lie on any convenient plane that contains $\vec{\tau}_3$ while maintaining the condition of $\vec{\tau}_c \cdot \vec{\tau}_{\omega c} = \vec{\tau}_f \dot{\vec{\tau}}_{\omega f}$, $|\vec{\tau}_c| = |\vec{\tau}_f|$ and $|\vec{\tau}_{\omega c}| = |\vec{\tau}_{\omega f}|$. However, from (eq. 12) and (eq. 13), we also know that $\vec{\tau}_c - \vec{\tau}_3$ and $\vec{\tau}_{\omega c} - (\dot{\vec{\tau}}_3 \times \vec{\tau}_c)$ must be perpendicular to one another. Thus by taking the dot product of $\vec{\tau}_c - \vec{\tau}_3$ and $\vec{\tau}_{\omega c} - (\vec{\tau}_3 \times \vec{\tau}_c)$, and setting it to zero, we get the condition, $$(\vec{\tau}_{\omega c} - (\vec{\tau}_3 \times \vec{\tau}_c)) \cdot (\vec{\tau}_c - \vec{\tau}_3) = \vec{\tau}_{\omega x} \cdot (\vec{\tau}_c - \vec{\tau}_3) = 0 \quad \text{(eq. 14)}$$

Figure 5A:
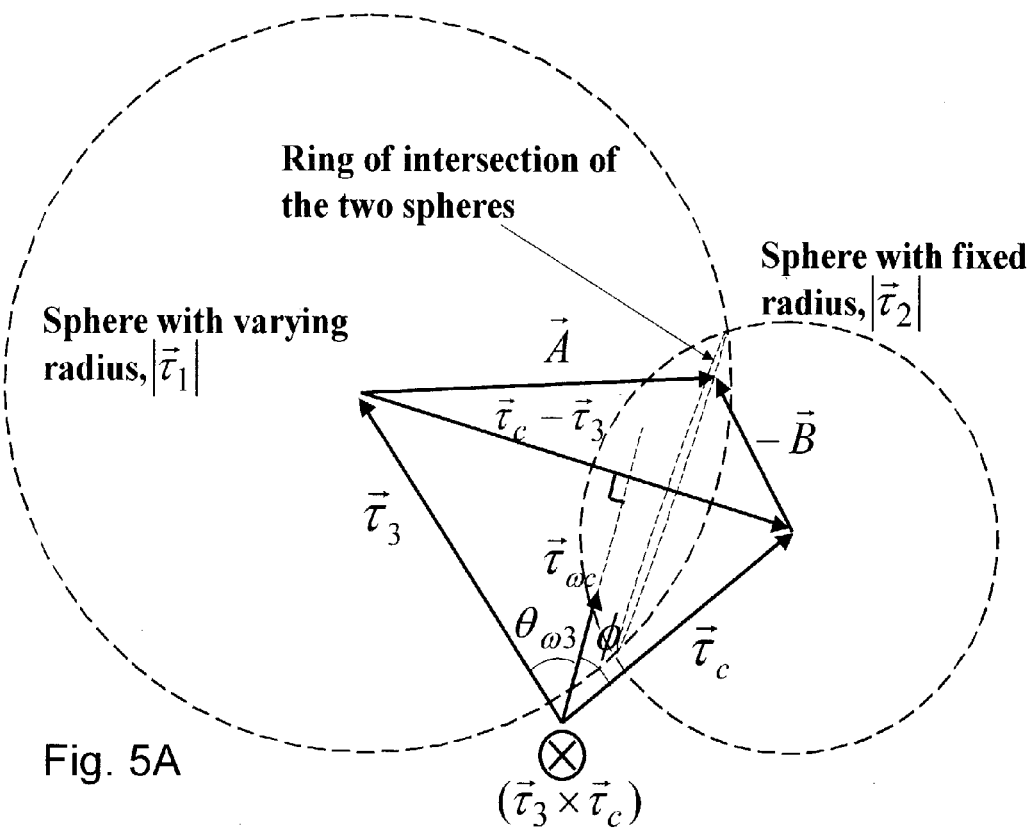
FIG. 5A is a vector diagram showing the relative orientations of the PMD vectors generated in the PMD compensator shown in FIG. 3.

Therefore, portion 99 can only produce pairs of $\vec{\tau}_c$ and $\vec{\tau}_{\omega c}$ that satisfy the condition of (eq. 14). Denote by $\theta_{\omega 3}$ the angle between $\vec{\tau}_{\omega c}$ and $\vec{\tau}_3$, and by $\phi$ the angle between $\vec{\tau}_c$ and $\vec{\tau}_{\omega c}$ (which is required to be the same as that between $\vec{\tau}_f$ and $\vec{\tau}_{\omega f}$), as shown in FIG. 5A. Then we find from (eq. 14):

$$\cos\theta_{\omega 3} = \frac{|\vec{\tau}_c|}{|\vec{\tau}_3|}\cos\phi - \frac{|\vec{\tau}_f|}{|\vec{\tau}_3|}\cos\phi \quad \text{(eq. 15)}$$

This fixes the vectors $\vec{\tau}_c$ and $\vec{\tau}_{\omega c}$ in that chosen plane. Thus now we know the first and second order PMD vectors, $\vec{\tau}_c$ and $\vec{\tau}_{\omega c}$, that portion 99 must produce, so that by applying a suitable rotation matrix, $C_0$, we can satisfy both (eq. 6) and (eq. 7), and the net first and second order PMD are eliminated. With the known $\vec{\tau}_c$ and $\dot{\vec{\tau}}_{\omega c}$, we can now solve for $\vec{A}$ and $\vec{B}$, and thus the corresponding $C_1$ and $C_2$ to produce them. FIG. 5A also illustrates the relative orientations of vectors that are discussed above to visualise that solutions of $\vec{A}$ and $\vec{B}$ exist. Due to $C_2$, $\vec{B}$ can be of any direction with fixed magnitude $|\vec{\tau}_2|$ while, due to $C_1$ and variable $|\vec{\tau}_1|$, $\vec{A}$ can be of any direction and of any magnitude.

FIG. 5A shows the relative orientations or $\vec{\tau}_c$, $\vec{\tau}_{\omega c}$, $\vec{\tau}_3$, $\vec{A}$ and $\vec{B}$. $\phi$ is the angle between $\vec{\tau}_c$ and $\vec{\tau}_{\omega c}$ which is required to be the same as that between $\vec{\tau}_j$ and $\vec{\tau}_{\omega f}$. The condition of (eq. 14) requires $\vec{\tau}_{\omega c}$ to be perpendicular to $\vec{\tau}_c - \vec{\tau}_3$. $C_0$ allows us to arbitrarily fix $\vec{\tau}_c$ and $\vec{\tau}_{\omega c}$ on any arbitrary plane that contains $\vec{\tau}_3$. Vectors $\vec{A}$ and $-\vec{B}$ point from the center of the spheres to a point on the ring of intersection of the two spheres so as to satisfy (eq. 12) and (eq. 13) simultaneously. Thus from FIG. 5A, it can be seen geometrically that solutions of $\vec{A}$ and $\vec{B}$ always exist, under the assumption that the required magnitude $|\vec{\tau}_1|$ is available in the setup. The typical tuning range of $|\vec{\tau}_1|$ is from 0 ps to a few times the mean DGD of transmission fiber 15, such as greater than five to ten times.

Mathematically, we can solve for $\vec{A}$ and $\vec{B}$ in the following way. Substituting (eq. 12) into (eq. 13), we have $$\vec{\tau}_{107\,c} - (\vec{\tau}_3 \times \vec{\tau}_c) = \vec{B} \times (\vec{\tau}_c - \vec{\tau}_3) \quad \text{(eq. 16)}$$

Figure 5B:
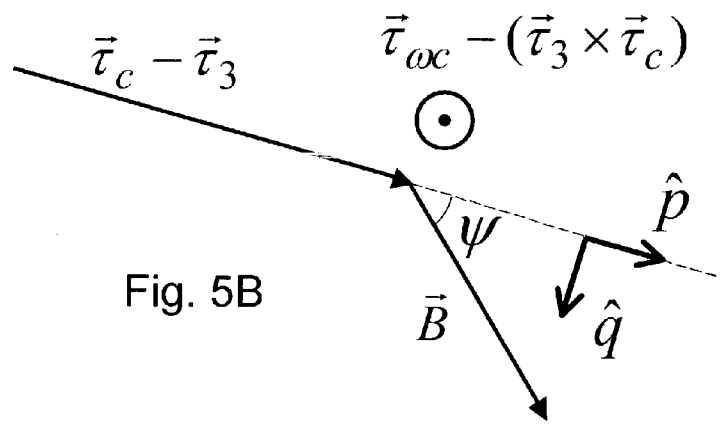
FIG. 5B is a vector diagram showing that the cross product of $\vec{B}$ and $\vec{\tau}_c - \vec{\tau}_3$ gives $\vec{\tau}_{\omega c} - (\vec{\tau}_3 \times \vec{\tau}_c)$.

Note that according to (eq. 10), $|\vec{B}| = |\vec{\tau}_2|$. Thus the solution of $\vec{B}$ is $$\vec{B} = |\vec{\tau}_2|(\cos\psi\hat{p} + \sin\psi\hat{q}) \quad \text{(eq. 17)}$$

where $\hat{p}$ is the unit vector in the direction of $(\vec{\tau}_c - \vec{\tau}_3)$, $\hat{q}$ is the unit vector in the direction of $[(\vec{\tau}_c - \vec{\tau}_3) \times (\vec{\tau}_{\omega c} - (\vec{\tau}_3 \times \vec{\tau}_c))]$ and $\psi$ is the angle between $\vec{B}$ and $(\vec{\tau}_c - \vec{\tau}_3)$, shown in FIG. 5B, given by:

$$\sin\psi = \frac{|(\vec{\tau}_{\omega c} - (\vec{\tau}_3 \times \vec{\tau}_c))|}{|\vec{\tau}_2||\vec{\tau}_c - \vec{\tau}_3|} \quad \text{(eq. 18)}$$

FIG. 5B shows that the cross product of $\vec{B}$ and $\vec{\tau}_c - \vec{\tau}_3$ gives $\vec{\tau}_{\omega c} - (\vec{\tau}_3 \times \vec{\tau}_c)$. Vector $\hat{q}$ is the unit vector in the direction of $[(\vec{\tau}_c - \vec{\tau}_3) \times (\vec{\tau}_{\omega c} - (\vec{\tau}_3 \times \vec{\tau}_c))]$ while $\hat{p}$ is the unit vector in the direction of $(\vec{\tau}_c - \vec{\tau}_3)$.

After solving for $\vec{B}$, we solve for $\vec{A}$ using equation (eq. 12). Since we are using variable DGD segment 65 for $\vec{\tau}_1$, we can accommodate whatever magnitude $\vec{A}$ is needed to satisfy (eq. 12). The magnitude of $|\vec{A}|$ solution gives the required DGD setting, $|\vec{\tau}_1|$, of segment 65. To ensure robust PMD compensation, we need to choose the magnitude of $\vec{\tau}_2$ and $\vec{\tau}_3$ appropriately so that we can always have solutions for (eq. 15) and (eq. 18) with any anticipated magnitude of $\vec{\tau}_f$ and $\vec{\tau}_{\omega f}$.

Since we know $R_3$, $\vec{\tau}_2$, $R_2$, $\vec{\tau}_1$ of the individual segments, using (eq. 10), we can solve for the rotation matrix $C_2$ from $$C_2\vec{\tau}_2 = R_3^+\vec{B} \quad \text{(eq. 19)}$$

And then, using (eq. 11), we can solve for $C_1$ $$C_1\vec{\tau}_1 = (R_3C_2R_2)^+\vec{A} \quad \text{(eq. 20)}$$

Now we can compute $$R_c = R_3C_2R_2C_1R_1 \quad \text{(eq. 21)}$$

and using (eq. 6), (eq. 7) and (eq. 21), we can solve for $C_0$ that satisfies both $$C_0\vec{\tau}_f = -(R_c)^+\vec{\tau}_c \quad \text{(eq. 22a)}$$

$$C_0\vec{\tau}_{\omega f} = -(R_c)^+\vec{\tau}_{\omega c} \quad \text{(eq. 22b)}$$

so that the net first and second order PMD are eliminated. Thus we have found all the required rotation matrices, $C_0$, $C_1$, and $C_2$ of the three polarization rotators as well as the required DGD value for the first segment, in order to compensate any first order PMD, $\vec{\tau}_f$, and any second order PMD, $\vec{\tau}_{107\,f}$ of the transmission cable.

Specifically, control signal 40 is given by the matrix solution of $C_0$ that satisfies both (eq. 22a) and (eq. 22b) for specific values of $\vec{\tau}_f$ and $\vec{\tau}_{\omega f}$, control signal 45 is given by the magnitude of the solution of $\vec{A}$ in (eq. 12), control signal 50 is given by the matrix solution of $C_1$ that satisfies (eq. 20), and control signal 55 is given by the matrix solution of $C_2$ that satisfies (eq. 19).

The PMD compensator of FIG. 3 is expected to introduce loss of several dB, especially since a variable DGD is used. Hence, an optical amplifier may be needed.

In a modification (not shown), the variable DGD segment is replaced with a concatenation of fixed DGD segments, but at least six fixed DGD segments are needed for the PMD compensator of this modification.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A device for reducing distortion in an optical signal, comprising:
    a PMD detector for sensing first order PMD and second order PMD in the optical signal and for generating at least one feedforward control signal in accordance with the sensed first and second order PMD, and
    a PMD compensator, having at least three concatenated segments with first order PMD $\vec{\tau}_1$, $\vec{\tau}_2$, $\vec{\tau}_3$, and rotation matrices $R_1$, $R_2$, $R_3$, respectively, and having at least three polarization controllers with respective rotation matrices $C_0$, $C_1$, $C_2$, and a variable delay in series between two of the at least three polarization controllers, the PMD compensator for altering the optical signal in accordance with the at least one feedforward control signal to generate a corrected optical signal that is substantially devoid of first and second order PMD,
    wherein the at least one feedforward control signal determines values for the rotation matrices $C_0$, $C_1$, $C_2$, and includes a signal of the magnitude of the solution of $\vec{A}$ given by $\vec{\tau}_c - \vec{\tau}_3 = \vec{B} + \vec{A}$
    where
    $\vec{\tau}_c$ is the first order PMD in a portion of the PMD compensator lacking the first of the at least three polarization controllers,
    $\vec{B} = R_3 C_2 \vec{\tau}_2$ and
    $\vec{A} = R_3 C_2 R_2 C_1 \vec{\tau}_1$.

2. The device of claim 1, wherein the PMD compensator includes three polarization controllers arranged in series.

3. The device of claim 2, wherein each of the polarization controllers is a cascade of at least two tunable wave-plates with fixed slow axis of orientation.

4. The device of claim 2, wherein each of the polarization controllers is a cascade of at least two fixed wave-plates with adjustable slow axis of orientation.

5. A device for reducing distortion in an optical signal provided by a transmission cable having first order PMD $\vec{\tau}_f$ and second order PMD $\vec{\tau}_{\omega f}$, comprising:
    a PMD detector for sensing first order PMD and second order PMD in the optical signal and for generating at least one control signal in accordance with the sensed first and second order PMD, and
    a PMD compensator, including at least three concatenated segments with first order PMD $\vec{\tau}_1$, $\vec{\tau}_2$, $\vec{\tau}_3$, and rotation matrices $R_1$, $R_2$, $R_3$, respectively, and including three polarization controllers arranged in series, for altering the optical signal in accordance with the at least one control signal to generate a corrected optical signal that is substantially devoid of first and second order PMD,
    wherein the at least one control signal includes signals $C_0$, $C_1$, $C_2$ for each of the three polarization controllers given by $C_0 \vec{\tau}_f = -(R_c)^+ \vec{\tau}_c$, $C_0 \vec{\tau}_{\omega f} = -(R_c)^+ \vec{\tau}_{\omega c}$, $C_1 \vec{\tau}_1 = (R_3 C_2 R_2)^+ \vec{A}$ and $C_2 \vec{\tau}_2 = R_3^+ \vec{B}$
    where
    $\vec{\tau}_c$ is the first order PMD in a portion of the PMD compensator lacking the first of the at least three polarization controllers,
    $\vec{\tau}_{\omega c}$ is the second order PMD in the portion of the PMD compensator lacking the first of the at least three polarization controllers,
    $R_c$ is the rotation matrix in the portion of the PMD compensator lacking the first of the at least three polarization controllers,
    $\vec{B} = R_3 C_2 \vec{\tau}_2$ and
    $\vec{A} = R_3 C_2 R_2 C_1 \vec{\tau}_1$.

6. The device of claim 2, wherein the variable delay is a variable delay line in free space.

7. The device of claim 2, wherein the PMD compensator also includes two fixed delays in series with the polarization controllers.

8. The device of claim 1, wherein the PMD detector includes an optical filter, a polarimeter and a computer.

9. A method for reducing distortion in an optical signal, comprising:
    sensing first order PMD and second order PMD in the optical signal,
    generating at least one feedforward control signal in accordance with the sensed first and second order PMD, and
    altering the optical signal, using a PMD compensator having at least three concatenated segments with first order PMD $\vec{\tau}_1$, $\vec{\tau}_2$, $\vec{\tau}_3$, and rotation matrices $R_1$, $R_2$, $R_3$, respectively, and at least three polarization controllers with respective rotation matrices $C_0$, $C_1$, $C_2$, and a variable delay in series between two of the at least three polarization controllers, in accordance with the at least one feedforward control signal to generate a corrected optical signal that is substantially devoid of first and second order PMD,
    wherein the at least one feedforward control signal determines values for the rotation matrices $C_0$, $C_1$, $C_2$, and includes a signal of the magnitude of the solution of $\vec{A}$ given by $\vec{\tau}_c - \vec{\tau}_3 = \vec{B} + \vec{A}$
    where
    $\vec{\tau}_c$ is the first order PMD in a portion of the PMD compensator lacking the first of the at least three polarization controllers,
    $\vec{B} = R_3 C_2 \vec{\tau}_2$ and
    $\vec{A} = R_3 C_2 R_2 C_1 \vec{\tau}_1$.

10. The method of claim 9, wherein the altering is performed by three polarization controllers arranged in series.

11. The method of claim 10, wherein each of the polarization controllers is a cascade of at least two tunable wave-plates with fixed slow axis of orientation.

12. The method of claim 10, wherein each of the polarization controllers is a cascade of at least two fixed waveplates with adjustable slow axis of orientation.

13. A method for reducing distortion in an optical signal provided by a transmission cable having first order PMD $\vec{\tau}_f$ and second order PMD $\vec{\tau}_{\omega f}$, comprising:

sensing first order PMD and second order PMD in the optical signal, generating at least one control signal in accordance with the sensed first and second order PMD, and altering, using a PMD compensator, including at least three concatenated segments with first order PMD $\vec{\tau}_1$, $\vec{\tau}_2$, $\vec{\tau}_3$, and rotation matrices $R_1$, $R_2$, $R_3$, respectively, and including three polarization controllers arranged in series, the optical signal in accordance with the at least one control signal to generate a corrected optical signal that is substantially devoid of first and second order PMD, wherein the at least one control signal includes signals $C_0$, $C_1$, $C_2$ for each of the three polarization controllers given by $C_0 \vec{\tau}_f = -(R_c)^+ \vec{\tau}_c$, $C_0 \vec{\tau}_{\omega f} = -(R_c)^+ \vec{\tau}_{\omega c}$, $C_1 \vec{\tau}_1 = (R_3 C_2 R_2)^+ \vec{A}$ and $C_2 \vec{\tau}_2 = R_3^+ \vec{B}$ where $\vec{\tau}_c$ is the first order PMD in a portion of the PMD compensator lacking the first of the at least three polarization controllers, $\vec{\tau}_{\omega c}$ is the second order PMD in the portion of the PMD compensator lacking the first of the at least three polarization controllers, $R_c$ is the rotation matrix in the portion of the PMD compensator lacking the first of the at least three polarization controllers, $\vec{B} = R_3 C_2 \vec{\tau}_2$ and $\vec{A} = R_3 C_2 R_2 C_1 \vec{\tau}_1$.

14. The method of claim 10, wherein the variable delay is a variable delay line in free space.

15. The method of claim 10, wherein altering is performed by two fixed delays in series with the polarization controllers.

16. The method of claim 9, wherein the sensing is performed by an optical filter and a polarimeter, and the generating is performed by a computer.

* * * * *